3,006,871
METHOD OF MAKING CELLULAR FURANE RING COMPOUND MODIFIED UREA-FORMALDEHYDE CONDENSATES AND ARTICLES OBTAINED THEREBY

George B. Sunderland, White Plains, N.Y., assignor to American Cyanamid Company, New York, N.Y., a corporation of Maine
No Drawing. Filed June 23, 1959, Ser. No. 822,207
7 Claims. (Cl. 260—2.5)

This invention relates to cellular articles or solid foams derived from urea-formaldehyde condensates, which products exhibit improved physical properties. More specifically, this invention relates to the method of making solid resin foams from a urea-formaldehyde condensate modified with a compound containing a furane ring structure and to foam products exhibiting improved resiliency, abrasion resistance and compressive strength properties prepared therefrom.

Resin foams derived from urea-formaldehyde condensates are employed for a wide variety of applications including largely the preparation of insulating and acoustical materials and less extensively in the preparation of novelties such as for example "floral-life" bases and the like. All of the foams heretofore commercially produced from urea-formaldehyde condensates by and large suffer in that they are inherently relatively fragile and possess comparatively low resiliency and abrasion resistance characteristics. The lack of compressive strength and abrasion resistance associated with foams prepared from the prior art urea-formaldehyde condensates have adversely affected the economical usefulness of such products. For instance, in the manufacture of insulating blocks it is necessary to cut or eventually shape the foam product and as a result large losses by breakage and disintegration are experienced. Furthermore, excessive care must be exercised by the consumer in slightly bending, compressing or otherwise handling these materials as the particular use situation may demand. The need for a fair degree of abrasion resistance and compressive strength in foams used to prepare novelties is apparent.

Commercially produced urea-formaldehyde resin foams range in weight per cubic feet from about 0.5 to 2 pounds. The lower the weight per unit volume, the more fragile is the foam. As the weight per unit volume increases decided improvement in this regard is noted. However, as the density is increased there is a tendency for the foam to evidence cracking failures during the preparation or manufacture thereof. Consequently, commercial foam products seldom have a specific gravity in excess of about 2 pounds per cubic foot.

The manufacture of solid foams from thermosetting resins such as urea-formaldehyde condensates has become a comparatively well-developed art in recent years. While there are a number of different methods and numerous modifications thereof employed in the preparation of urea-formaldehyde foams, the conventionally observed process basically concerns that of preparing a foam-like suspension of an aqueous solution of a urea-formaldehyde condensation product with the aid of a surface active agent. Generally, after a suspension of required specific gravity is obtained which will give the type of product having the cellular characteristics desired, the suspension is contacted with a hardening agent, more specifically, a water-soluble acid type condensation catalyst. In the alternative the suspension may be foamed in the presence of the hardening agent. Following either procedure, the foam is then suitably subjected to elevated temperatures, which treatment facilitates the hardening of the condensate and at the same time partially frees the water associated therewith.

As mentioned hereinabove there have been many attempts by the prior art to improve the physical properties of urea-formaldehyde resin foams. Most of these attempts have been confined to the manipulative steps employed in the production of the foam. It is contemplated that the best of these procedures may be appropriated to produce the resin foams of this invention. However, the novel improvements to be realized in the practice of this invention are fundamentally related to the nature of the particular type of urea-formaldehyde condensate I contemplate using in the preparation of the foam.

The particular types of urea-formaldehyde condensation product which have been discovered as ideally suited to prepare improved resin foams are those which have been modified by a furane derivative such as furfuryl alcohol or furfural as disclosed in the Simons Patent, 2,518,388. These condensates have been disclosed in the aforesaid patent as useful to prepare adhesive compositions which show improved dimensional stability characteristics at the thicknesses of the glue lines ordinarily used in adhesive applications. Accordingly, the forte of these modified urea compositions when employed in adhesive applications resided in their ability to show a minimum degree of cracking or crazing at a minimum of filler loading when the composition was converted to a substantially insoluble and infusible state. This in turn ultimately contributed to the composition's excellent permanent bonding or adhesive characteristics.

In the preparation of foams from thermosetting resinous compositions, such as the urea resins with which this invention is concerned, the inherent lack of abrasion and compressive strength observed for these resins are not regarded as particularly associated with the resin's lack or possession of unusual dimensional stability characteristics. The fragility usually observed for urea resin foams while mainly inherent in the nature of the condensate, is believed by those skilled in the art to be influenced, that is, increased or decreased by the mechanism with which the contained water leaves the aqueous foam during the hardening and drying procedure. Therefore, it was a strictly fortuitous discovery to observe that these modified compositions which have particular utility in the preparation of adhesives were excellent materials for the preparation of thermoset resin foams having superior and improved physical properties.

The resins which may be used to prepare the foams in accordance with this invention are essentially urea-formaldehyde condensates modified with a compound containing a furane ring structure, e.g., furfuryl alcohol or furfural. Furfuryl alcohol is the preferred modifier. Generally, it is desirable to prepare such modified compositions employing initially a preformed urea-formaldehyde condensate although it is feasible to prepare the modified resin starting with the ingredients urea, furfuryl alcohol and formaldehyde.

The ratio of formaldehyde to urea useful in preparing such condensates ranges from about 2:1 to 1:1, respectively. Insofar as the compound urea will readily methylolate with amounts of formaldehyde up to about 1.7 mols of formaldehyde per mole of urea, the preferred maximum of formaldehyde based on the urea is accordingly 1.7. The preferred minimum amount of formaldehyde on the same basis is approximately 1.4.

The condensation between the urea and formaldehyde should be carried out under alkaline conditions and any pH in the range of from about 7 to 10 may be used. The preferred pH range for effecting the methylolation is from about 7.5 to 9. The reaction under the alkaline conditions specified for the most part results in the methylolation of the urea although some degree of polymerization may occur. Therefore, suitable products are obtained as soon as the uncombined formaldehyde within the reaction mixture reaches a substantially minimum constant value. The condensation, however, should not be carried beyond the point where the resin begins to develop a degree of hydrophobic characteristics such as represented by a 20% aqueous solution of the condensate exhibiting haziness.

The preparation of the urea-formaldehyde condensate may be accomplished at temperatures ranging from room temperatures as high as the reflux temperature, that is, approximately 100° C. The preferred reaction temperature is from about 50° C. to the above stated maximum. The alkaline materials which will effect the required basic conditions specified are well known in the art.

To achieve the modification of the urea condensates, the condensates are then mixed with a compound containing a furane ring structure such as furfuryl alcohol or furfural. These modifiers may be employed in amounts ranging from about 0.05 part to 0.5 part per part of the urea resin. However, the optimum results are realized when the ratio of the urea-formaldehyde resin to the furane ring containing compound is in the order of 1:0.4, respectively. The compound containing a furane ring structure may be simply blended at room temperature with the urea resin and the mixture adjusted to slightly alkaline conditions, and as such may be used in the practice of this invention. However, it is preferred to effect mixing of the urea resin and the modifier in the ratios as aforesaid, and moderately heat treat this mixture under alkaline conditions. Suitable alkaline conditions range from about pH of 7.5 to 9. The temperature employed in accomplishing the heat-treatment of the urea and modifier range from about 40° C. to 100° C. The times at which the composition containing the modifier is held depends on the temperature employed. Thus suitable compositions can be made at the elevated temperatures stated by holding for about ½ hour or progressively increasing the holding time as the lower temperatures are employed. For example, where a temperature of about 50° C. is used, the composition may be safely and beneficially held for several hours.

It is believed that a moderate and desirable amount of coreaction occurs between the urea-formaldehyde condensate and the furane compound during the heating of same under alkaline conditions as set forth above. Accordingly, it is preferred to preliminarily coreact these ingredients to the extent specified under the alkaline conditions before employing the modified compositions in the preparation of the aqueous foam.

While formaldehyde has been specifically mentioned as the aldehyde component for preparing the condensates, it is to be understood that the regarded equivalents thereof such as paraformaldehyde and hexamethylenetetraamine may be used.

The preparation of the urea-formaldehyde condensate is most conveniently carried out in an aqueous medium. Additionally, it is contemplated that the procedure for accomplishing coreaction of the modifier with the urea condensate, if observed, be carried out in an aqueous medium. Suitable solid contents for effecting the condensation step or coreaction with the furane compound range from about 30 to 80 percent. A range in the order of from about 60–80% reaction solids is preferred mainly to obviate extensive dehydration procedures, as it is desirable for stability purposes to have the aqueous syrup at relatively high solids contents if long storage periods are anticipated therefor.

There are various methods practiced for effecting the aeration of aqueous resinous syrups in the preparation of foams. One of such methods consists of dissolving gas under pressure in the resinous syrup and thereupon curing the resin component while releasing the pressure abruptly thus producing the foam.

Another common practice is to include a blowing agent, such as azide in the resin itself or a solution thereof during the curing step, such blowing agent advantageously being capable of generating gas at the curing temperature thereby forming the foam product.

Still another method, and one which I prefer to use in the practice of my invention, consists merely of whipping air into an aqueous syrup of the urea-formaldehyde condensate whereby the formation of a reasonably stable foam is facilitated by the presence of a surface active foaming agent.

In accordance with said preferred method of producing the foam, the urea resin, and specifically the modified urea-formaldehyde condensate of this invention, is diluted with water so that the resin solids of the solution to be whipped is in the order of from about 20 to 40%. Concentrations of the resin above about 40% are to be avoided insofar as the concentrated solutions are difficult to whip into a foam. Concentrations less than about 20% solids are undesirable because of the tendency for many urea condensates to evidence some insoluble characteristics in this dilution area.

To this solution is added a suitable foaming agent to facilitate the formation of a foam having some degree of stability. Among the suitable foaming agents or surface active materials are such as the diacetyl esters of sodium sulfo-succinic acid, sulfates of fatty acid monoglycerides, fatty alcohol sulfates, sodium alkyl aryl sulfonates, sorbitan monolaurates, polyoxyethylene ethers of palmitic acid, butylated naphthalene sulfonic acid, and the like. The amount of foaming agent can be varied over a range depending on a number of factors such as the particular type of surface active agent employed, concentration of solids in the aqueous syrup, and the like. The usual amount of the more commonly used surface active agent ranges from about 1 to 2% based on the resin solids.

The aeration of the resinous syrup can be accomplished by merely whipping same in a mechanical mixer such as a Hobart mixer. Mixing in this manner is carried out until a foam having the desirable specific gravity is obtained. A specific gravity in the order of from about 50 to 60 grams per liter is usually found adequate to produce a final product with the desired consistency. After the foam is whipped to the desired specific density a catalyst is then added thereto. The amounts of catalyst that may be used depends to some extent on the nature of the acid employed but generally is within the range of from about 1 to 5% based on the resin content of the foam. A particularly suitable acid consists of phosphoric acid. However, other organic acids may be used such as formic, acetic, etc. Also, inorganic acids such as sulfuric, hydrochloric and the like may be suitably used.

Following the acidification of the foam, it is extruded or otherwise molded as quickly as is practical and the molded foam then introduced into an oven. During the drying operation it is desirable not to have the foam exist in thickness greater than about 10" because thicker deposits of the foam may result in a significant degree of collapse during the heating or curing process. A number of suitable drying means may be used in treating the foam during this step. The use of steam heated coils represents such means for effecting the curing and drying operation.

The following examples are given primarily as illustrative of this invention and they are not be construed in any manner as limitative thereof except as indicated in the appended claims.

PREPARATION OF UREA-FORMALDEHYDE RESIN

A hydrophilic condensate of urea and formaldehyde having a molar ratio of 1:1.7, respectively, is made in the following manner. Into a suitable reaction vessel equipped with a stirrer, thermometer and reflux condenser are charged 1380 parts of low methanol content Formalin (37% aqueous formaldehyde) and 600 parts of urea.

The pH of the reaction mixture is adjusted to 8.0 by the addition of a sufficient amount of triethanolamine. The reaction mixture is heated with stirring to 46° C. in 30 minutes. The reaction is then carried out at 46°–50° C. until a reaction product containing a free formaldehyde content of about 5% is obtained (approximately 1 hour). Thereupon, the resin syrup is heated to 60° C. and vacuum concentrated at 23″ vacuum (approximately 7″ Hg pressure) until 400 parts of water are removed, thus resulting in a resinous syrup having 70% resin solids.

*Example I*

Into a suitable reaction vessel are charged 286 parts of the urea resin syrup (70% resin solids) described above, 80 parts of furfuryl alcohol and 2 parts of tricalcium phosphate. The pH of the charged ingredients is adjusted to 8 with triethanolamine and the reaction mixture then heated to about 90° C. in a period of about ½ hour. A temperature of 90° C. is maintained for about 15 minutes and the batch cooled to 30° C. in about 80 minutes.

Into a holding tank is charged the above-described furfuryl alcohol modified urea resin syrup. The solids content of the syrup is adjusted to 30%. The temperature of the diluted material is adjusted to 70° F. and then pumped into a Hobart mixer at a rate of 21 pounds per minute. Simultaneously, an 6% aqueous solution of Dupanol WA (fatty alcohol sodium sulfate) is introduced into said mixer at a rate of 1.5 pounds per minute. The composition is then foamed with air and the over-flow discharged continuously into a stainless steel trough where 1 pound of 10% aqueous phosphoric acid is added per minute, thus reducing the foam to approximately 28% solids. The catalyzed foam is continuously fed to a Hobart mixer and briefly whipped so as to result in a foam having a density of 53 grams per liter. The foam from the final whipping operation is fed by gravity onto a continuous drier belt traveling at a rate of 4 feet per minute. The depth of the foam on the belt is adjusted to 6–6½″ by means of a leveling blade or "puddler." The belt containing the bed of foam is immediately introduced into a tunnel dryer heated by means of a coil heater containing steam at 50 p.s.i. After a residence time in the drying tunnel of 12 minutes, the foam firmly sets without any indication of significant collapse. Complete drying of the set foam is effected in a kiln and accomplished by cutting blocks of foam (1′ x 2′ x 6″) from the material emerging from the drier, inverting same on drying racks and placing in the kiln at 125–175° F. for 12 hours. The dried foam blocks are then further reduced to a size corresponding to 4½″ x 3½″ x 10″ blocks each having a weight of approximately 1/10 pound.

A sample block of final size made in acordance with this example possessed the ability to withstand in excess of 3 p.s.i. pressure and to have its volume reduced by 20% without crumbling. The abrasion resistance and resiliency of the foam block prepared in accordance with this example were found to be markedly superior to a foam product similarly prepared from an unmodified urea-formaldehyde condensate wherein the molar ratio of urea to formaldehyde was 1:1.7, respectively.

*Example II*

To a mixing vessel are added 143 parts of the urea syrup (70% resin solids) the preparation of which is given hereinabove and 30 parts of furfural. These materials are stirred at room temperature until a homogeneous mixture is obtained.

The furfural modified resin is discharged into a shallow vessel and diluted with a sufficient amount of water so as to reduce the resin solids content to approximately 30%. To this diluted solution are added 4.5 parts of a 50% aqueous phosphoric acid solution and 6 parts of a 10% aqueous Dupanol solution. After the respective ingredients are homogeneously dispersed, the dispersion is foamed by whipping same with a hand egg beater. After the foam had obtained a density of .055 grams per ml. it is scooped into a paper container and dried at 145° F. The dried foam had exhibited a density of 1.3 pounds per cubic foot.

A foam prepared in accordance with this example exhibited physical properties comparable to the modified resin foam prepared in Example I.

What is claimed is:

1. A method of making a resilient, thermally hardened cellular article of manufacture exhibiting improved compressive strength and abrasion resistant properties which comprises: (1) forming an aqueous suspension having a resin solids content of from about 20 to 40 percent of (A) a urea-formaldehyde condensate which has been modified by a furane ring compound selected from the group consisting of furfural and furfuryl alcohol, said modified condensate having a mol ratio of urea to formaldehyde of from about 1:1 to 1:2, respectively, and a weight ratio of urea-formaldehyde condensate to furane ring compound of from about 1:0.05 to 1:0.5, respectively, and (B) from about 1 to 2 percent by weight, based on the weight of said resin solids, of a surface active foaming agent, (2) aerating said aqueous suspension to produce a resinous foam having a specific gravity of from about 0.05 to 0.06 and (3) heat curing said resinous foam in the presence of an acid catalyst whereby said resinous foam is converted to a substantially insoluble and infusible state.

2. A method of making a resilient, thermally hardened cellular article of manufacture exhibiting improved compressive strength and abrasion resistant properties which comprises: (1) forming an aqueous suspension having a resin solids content of from about 20 to 40 percent of (A) a urea-formaldehyde condensate which has been modified by furfural, said modified condensate having a mol ratio of urea to formaldehyde of from about 1:1 to 1:2, respectively, and a weight ratio of urea-formaldehyde condensate to furfural of from about 1:0.05 to 1:0.5, respectively, and (B) from about 1 to 2 percent by weight, based on the weight of said resin solids, of a surface active foaming agent, (2) aerating said aqueous suspension to produce a resinous foam having a specific gravity of from about 0.05 to 0.06 and (3) heat curing said resinous foam in the presence of an acid catalyst whereby said resinous foam is converted to a substantially insoluble and infusible state.

3. A method of making a resilient, thermally hardened cellular article of manufacture exhibiting improved compressive strength and abrasion resistant properties which comprises: (1) forming an aqueous suspension having a resin solids content of from about 20 to 40 percent of (A) a urea-formaldehyde condensate which has been modified by furfuryl alcohol, said modified condensate having a mol ratio of urea to formaldehyde of from about 1:1 to 1:2, respectively, and a weight ratio of urea-formaldehyde condensate to furfuryl alcohol of from about 1:0.05 to 1:0.5, respectively, and (B) from about 1 to 2 percent by weight, based on the weight of said resin solids, of a surface active foaming agent, (2) aerating said aqueous suspension to produce a resinous foam having a specific gravity of from about 0.05 to 0.06 and (3) heat curing said resinous foam in the presence of an acid catalyst whereby said resinous foam is converted to a substantially insoluble and infusible state.

4. A method of making a resilient, thermally hardened cellular article of manufacture exhibiting improved compressive strength and abrasion resistant properties which comprises: (1) forming an aqueous suspension having a resin solids content of from about 20 to 40 percent of (A) a urea-formaldehyde condensate which has been modified by a furane ring compound selected from the group consisting of furfural and furfuryl alcohol, said modified condensate having a mol ratio of urea to formaldehyde of from about 1:1.7 to 1:2, respectively, and a weight ratio of urea-formaldehyde condensate to furane ring compound of from about 1:0.4 to 1:0.5, respectively, and (B) from about 1 to 2 percent by weight, based on the weight of said resin solids, of a surface active foaming agent, (2) aerating said aqueous suspension to produce a resinous foam having a specific gravity of from about 0.05 to 0.06 and (3) heat curing said resinous foam in the presence of an acid catalyst whereby said resinous foam is converted to a substantially insoluble and infusible state.

5. A method of making a resilient, thermally hardened cellular article of manufacture exhibiting improved compressive strength and abrasion resistant properties which comprises: (1) forming an aqueous suspension having a resin solids content of from about 20 to 40 percent of (A) a urea-formaldehyde condensate which has been modified by furfural, said modified condensate having a mol ratio of urea to formaldehyde of from about 1:1.7 to 1:2, respectively, and a weight ratio of urea-formaldehyde condensate to furfural of from about 1:0.4 to 1:0.5, respectively, and (B) from about 1 to 2 percent by weight, based on the weight of said resin solids, of a surface active foaming agent, (2) aerating said aqueous suspension to produce a resinous foam having a specific gravity of from about 0.05 to 0.06 and (3) heat curing said resinous foam in the presence of phosphoric acid whereby said resinous foam is converted to a substantially insoluble and infusible state.

6. A resilient, thermally hardened cellular article of manufacture exhibiting improved compressive strength made according to the method of claim 1.

7. A resilient, thermally hardened cellular article of manufacture exhibiting improved compressive strength made according to the method of claim 5.

References Cited in the file of this patent

UNITED STATES PATENTS

| | | |
|---|---|---|
| 2,337,915 | Menger et al. | Dec. 28, 1943 |
| 2,518,388 | Simons | Aug. 8, 1950 |

UNITED STATES PATENT OFFICE

CERTIFICATE OF CORRECTION

Patent No. 3,006,871                      October 31, 1961

George B. Sunderland

It is hereby certified that error appears in the above numbered patent requiring correction and that the said Letters Patent should read as corrected below.

Column 5, line 26, for "6%" read -- 8% --.

Signed and sealed this 8th day of January 1963.

(SEAL
Attest:

ERNEST W. SWIDER                      DAVID L. LADD
Attesting Officer                      Commissioner of Patents